Oct. 13, 1970
J. N. STREET
3,533,694
PROCESS CONTROL STRIP EXPOSING DEVICE
Filed April 17, 1965
3 Sheets-Sheet 2
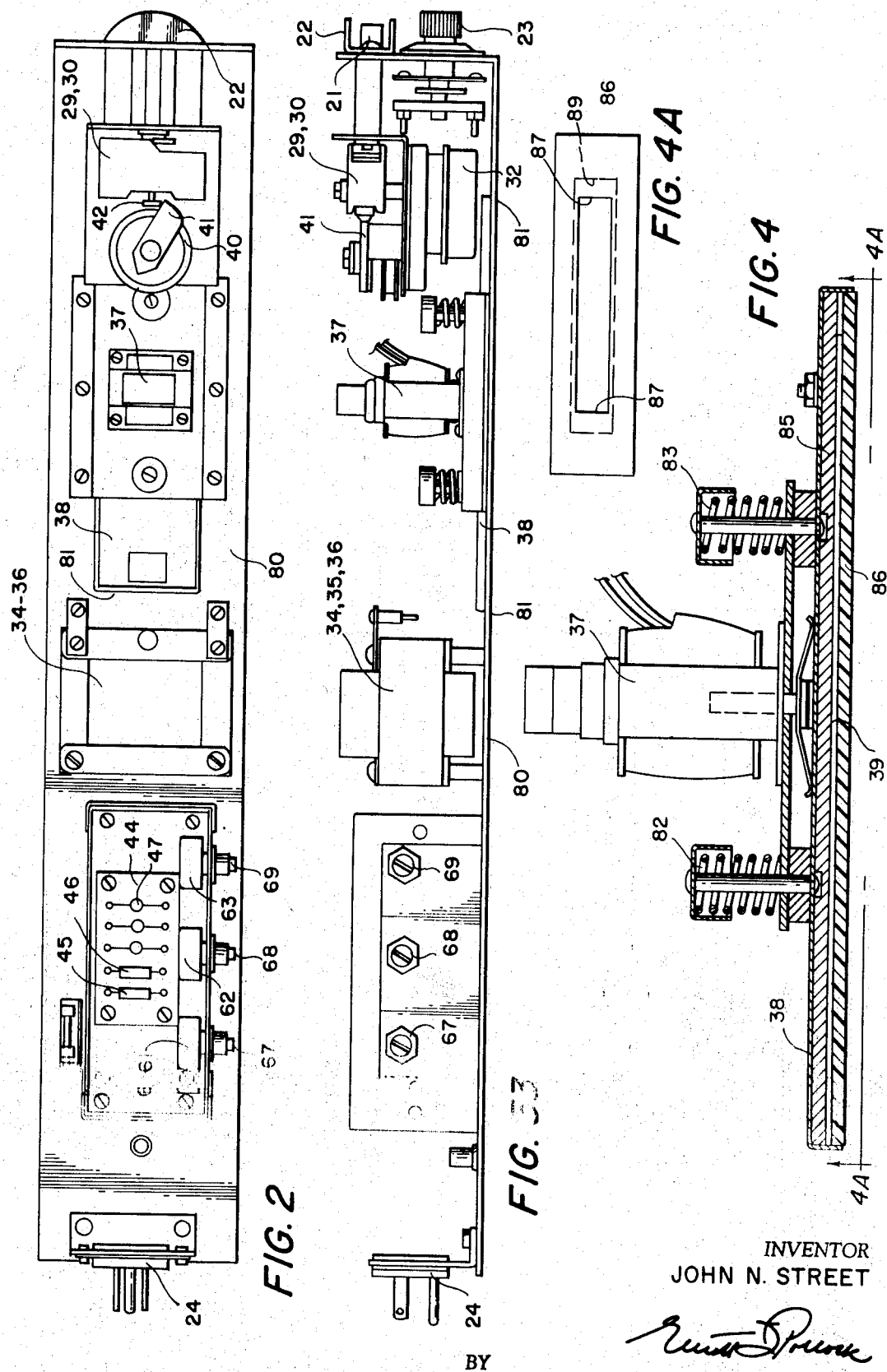
INVENTOR
JOHN N. STREET
BY
ATTORNEY

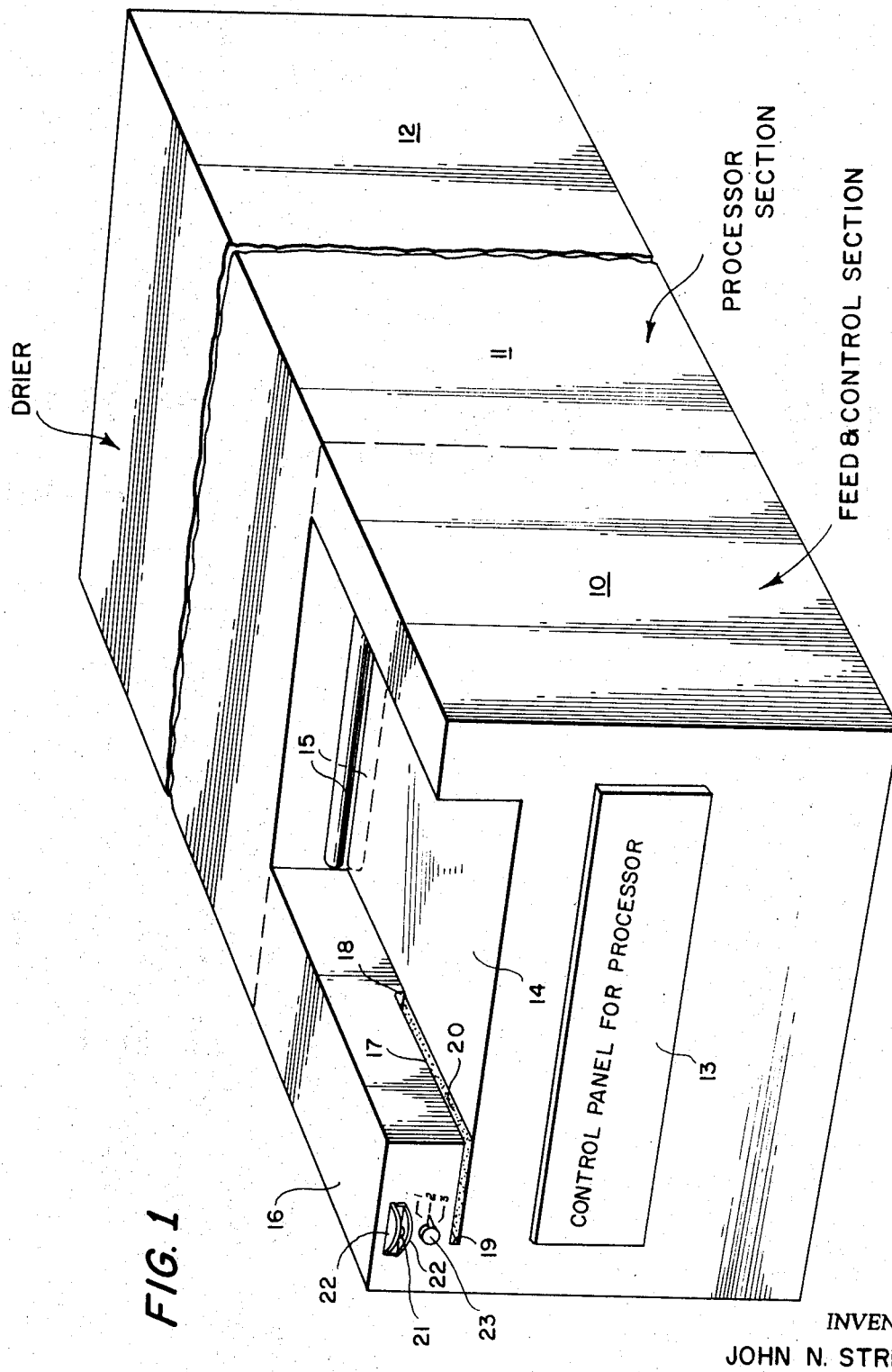

INVENTOR
JOHN N. STREET

BY

ATTORNEY

United States Patent Office 3,533,694
Patented Oct. 13, 1970

3,533,694
PROCESS CONTROL STRIP EXPOSING DEVICE
John N. Street, Alexandria, Va., assignor to
LogEtronics Inc., Springfield, Va.
Filed Apr. 17, 1968, Ser. No. 722,118
Int. Cl. G03b 27/30
U.S. Cl. 355—100     8 Claims

ABSTRACT OF THE DISCLOSURE

An automatic film processor has a process control strip exposing device mounted adjacent the feed tray of the processor as an integral part of the equipment. The exposing device has a fixed platen surface and associated side and end stops adapted to receive and accurately position the unexposed corner of a sheet of light-sensitive material to be processed in the automatic processor. The exposing device includes a movable platen cooperating with a solenoid and timing mechanism operative, when actuated, to clamp the sheet corner in place for a predetermined time interval, and simultaneously operative to move an electroluminescent area-printing light source and superimposed varying density transparency into contact with the sheet. Cooperating control means are provided for energizing the light source and for pre-selecting any one of a plurality of accurately regulated pre-adjusted exposing light levels.

BACKGROUND OF THE INVENTION

In the course of operating various photographic processors, particularly automatic film processors, it is often desired to obtain data indicative of developer activity, time, temperature, degree of agitation, etc., as well as data demonstrating the batch-to-batch variations in response (speed, gamma, density range, etc.) of a given type of light-sensitive emulsion when exposed and processed under identical controlled conditions. For the specific purpose of controlling automatic film processors, it has been the practice heretofore for processor operators to purchase in quantity, and at significant cost, so-called "process control strips" which are commercially available from various specialist suppliers. During the otherwise normal operation of the processor, these strips, which contain a precisely exposed latent image, are fed through the processor from time to time, e.g. at intervals such as one per hour or the like. During such feeding, the latent image on each strip is developed, fixed, washed and dried under controlled conditions. Each processed and dried control strip is then densitometrically measured, or visually compared with other such strips processed earlier, to evaluate the characteristics of the processing solutions thereby to detect possible trends relating to changes in the processor operation. On the basis of such information, appropriate adjustments may be effected in the chemical concentration and/or temperature of the processor solutions, e.g., by appropriate control of chemical replenishment, so that the chemistry of the solutions may be restored to desired characteristics before loss of processing control occurs.

Various arrangements for making and utilizing process control strips have already been described in the prior art, e.g., see U.S. patents to Wyckoff No. 3,001,459; Tyler No. 2,763,192; Capstaff No. 2,582,004; Fitch No. 2,533,-447; Sweet No. 2,457,746; Simmon No. 2,450,307; Kalish No. 2,212,834; Henderson No. 2,186,138; Doran No. 1,883,884; Owens No. 1,821,339; and Jones No. 1,762,925.

The use of such commercially available pre-exposed "process control strips" is subject to a number of disadvantages. For one, the purchased strips, which are relatively costly, rarely comprise an emulsion of the precise type which is being used in the process camera; and information derived from such prepurchased control strips therefore introduces an element of uncertainty due to the fact that the emulsion on the process control strip is normally different from that in routine use in the process camera. Moreover, commercially available process control strips, which contain a precisely exposed latent image, must be stored under carefully controlled conditions in order to minimize image degradation resulting from the effects of temperature, time, etc., thus introducing a further element of uncertainty when such strips are to be used as the "reference standard" in evaluating the hour-by-hour performance of a processing system. The actual results obtained using a pre-exposed commercially available process control strip may vary from one strip to the next due simply to different ages of the strips and different conditions of storage. As a result of all of these factors, the use of commercially available process control strips may well produce information which is significantly less accurate and convenient, and significantly more costly than may be desirable in any particular automatic film processing operation.

SUMMARY OF THE INVENTION

The present invention contemplates the provision of an automatic film processor which includes a process control strip exposing device as an integral part thereof. The process control strip exposing portion of the processor is adapted to permit an operator to make his own process control strip, immediately when needed (thereby eliminating uncertainties due to storage etc.), and to permit the making of the desired process control strip on the precise type of emulsion being used routinely in the process camera (thereby eliminating further uncertainties which arise by reason of differences in emulsions and within individual emulsion batches).

The overall processor has an input end provided with an input feed tray adapted to receive sheets of film which are to be fed in sequence through developer, fixer, and wash tanks, and through a drying section of the equipment. The process control strip exposing device of the present invention forms an integral part of the overall processor, and is disposed adjacent one side of the film feed tray. As a result, an operator of the processor (or an appropriate automatic feeding mechanism), prior to feeding a sheet of film through the processor itself, may initially insert a piece of sensitized material, or an unexposed edge of the sensitized image-bearing sheet to be processed into the exposing device and then, by appropriate actuation of control mechanisms forming a portion of the exposing device, obtain an accurately-timed and intensity-controlled control strip contact exposure on said piece or sheet. Subsequent to this forming of a control strip, the exposed piece of sensitized material, or the overall sheet, may immediately be fed through the processor for normal processing.

The process control strip exposing device includes a flat, resilient platen surface upon which the film piece, or the unexposed edge or corner of the film sheet, rests; and appropriate end and side stops are provided for accurate and repeatable positioning of the sensitized material on said platen. An electro-mechanical arrangement comprising a solenoid, and an associated manual control switch, operates to clamp the sensitized material in place and simultaneously operates to move a thin, electroluminescent area-printing light source of suitable spectral emission, over which is detachably superimposed a transmission grey scale (or scales) or any other desired varying density or image-bearing transparency, into contact with the emulsion side of the film piece or sheet. The control arrangement further includes a timing mechanism, and appropriate light intensity control means, for achieving a predetermined, accuracy timed and intensity controlled contact exposure from the electroluminescent light source via the aforementioned transparency. Means are provided for permitting selection of any one of a plurality of pre-adjusted light levels, so that the electroluminescent light level may be selected in accordance with the particular photographic speed of the film being processed.

The electro-mechanical control arrangement is such that, once actuated, the film piece or sheet corner is accurately and automatically clamped in place for a fixed time interval during which a pre-selected standard exposure is made, and the exposed material is then automatically released so that the piece or sheet with its latent control strip image can be immediately fed directly into the automatic processor for appropriate processing.

BRIEF DESCRIPTION OF THE DRAWINGS

FIG. 1 is a diagrammatic perspective view of a film processor constructed in accordance with the present invention;

FIG. 2 is a top view of a control strip exposing device chassis incorporated in the processor of FIG. 1;

FIG. 3 is a side view of the chassis shown in FIG. 2;

FIG. 4 is a detail view of the solenoid operated illuminated scale carrier incorporated in the chassis of FIGS. 2 and 3;

FIG. 4A is a bottom view of the structure of FIG. 4, at reduced scale, taken on the line 4A—4A of FIG. 4.

DESCRIPTION OF THE PREFERRED EMBODIMENT

Figure 5:
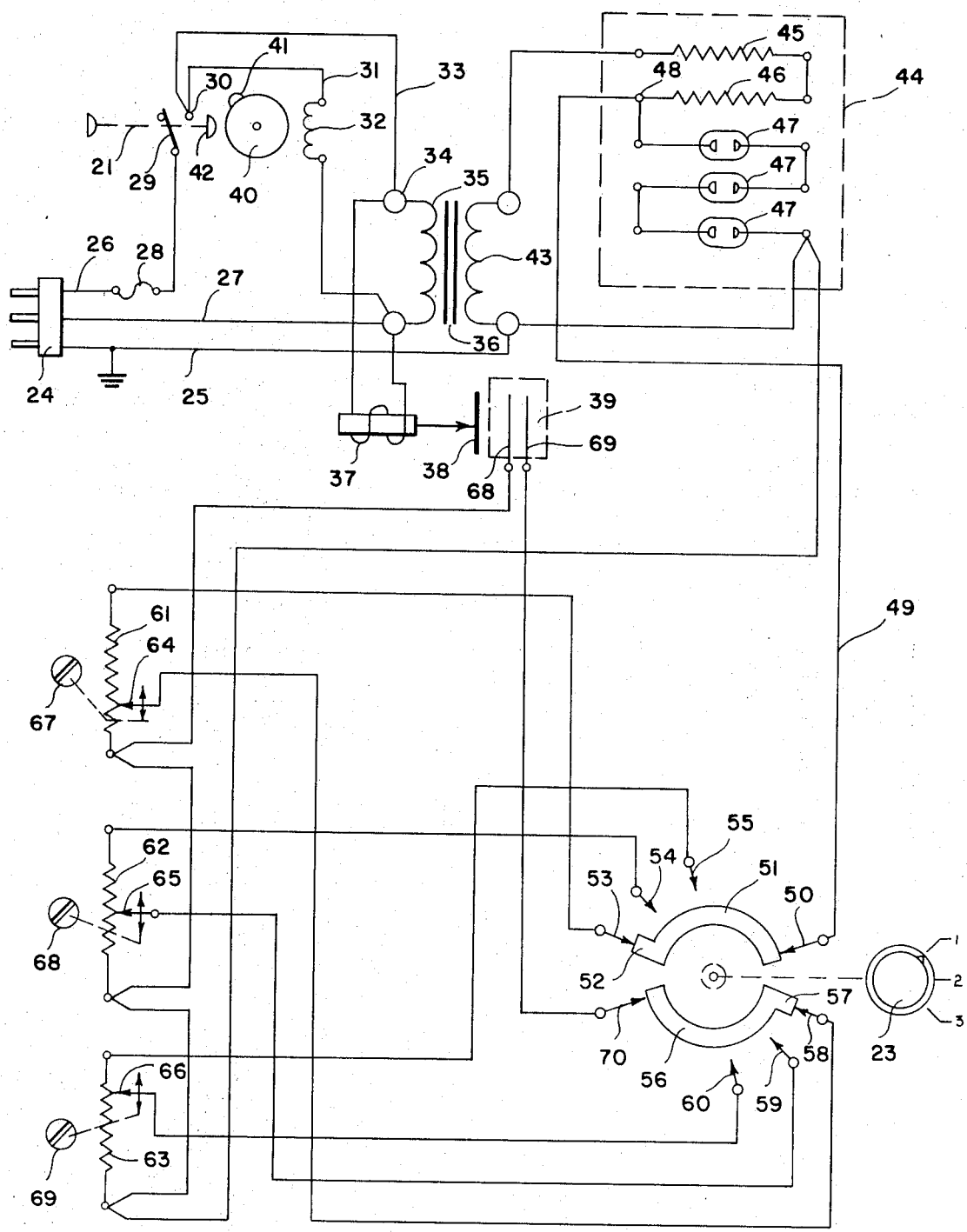
FIG. 5 is a schematic diagram of the process control strip exposing device of the present invention.

As shown in FIG. 1, a processor constructed in accordance with the present invention may include a feed and control section 10, a processor section 11 and a drier section 12 disposed within an appropriate housing in the sequence specified. Structures of this general type are, in themselves, well known. Section 10 has an appropriate control panel 13 associated therewith for controlling the processor operation; and said section 10 further includes a substantially horizontal feed tray 14 adapted to receive a sheet of film to be processed. Such a sheet may be received between appropriate powered rollers, generally designated 15 at the input end of processor section 11, whereafter the sheet may be appropriately transported through developer, fixer, and wash tanks incorporated in processor section 11. The processed sheet is then automatically transported through drier section 12, and emerges from said drier section for appropriate collection.

In accordance with the present invention, and for the purposes described previously, the processor of the present invention is modified to include, at one side of feed tray 14, a housing section 16 containing a process control strip exposing device of the type to be described hereinafter. Housing section 16 is constructed to define an entry slot 17 communicating with feed tray 14, said slot 17 being bounded at one of its ends by a wall 18 acting as an end stop, and bounded along one edge by a further wall 19 acting as a side stop. The lowermost surface of entry slot 17 comprises a resilient platen 20. Housing section 16 further includes a push button start switch 21 disposed between a pair of outstanding flanges 22 acting as a guard structure to prevent inadvertent depression of the push button 21; and the structure further includes a control knob 23 settable to any of three different positions so as to permit the selection of any one of three different pre-adjusted light levels during a fixed exposure time initiated by depression of push button start switch 21.

Housing section 16 encloses a chassis having various electrical and mechanical components mounted thereon forming a process control strip exposing device. This chassis, and the physical disposition of parts thereon, is shown in FIGS. 2, 3, 4, and 4A. The electromechanical configuration of the device is depicted in FIG. 5. For a more ready understanding of the invention, reference will initially be made to FIG. 5.

The process control strip exposing device of the present invention is designed for operation from any desired source of alternating current, with power being supplied to a plug 24. Line 25 coupled to plug 24 is maintained at ground potential, and two further lines 26 and 27 are energized in accordance with the power supplied to plug 24. Line 26 is fused at 28 and is connected to one end of a switch blade 29 adapted to be selectively moved by start push button 21 described previously. The other end of switch blade 29 cooperates selectively with a fixed contact 30 connected via line 31 to one side of a synchronous timing motor 32, the other side of which is connected to power line 27. Contact 30 is also coupled via line 33 to a terminal 34 coupled to one side of the primary winding 35 of a 10:1 step-up transformer 36. The other side of primary winding 35 is connected to power line 27.

Terminal 34 is further connected to one side of a solenoid 37 the other side of which is coupled to line 27. Solenoid 37, when energized, operates to depress a movable platen 38 against the restraint of spring members 82, 83 (see FIG. 4). Platen 38 incorporates an electroluminescent light source 39 so that, upon energization of solenoid 37, the portion of a sheet of film inserted into entry slot 17 (FIG. 1) will be clamped between movable platen 38 and resilient platen 20, and simultaneously exposed to light from source 39, for a precise and predetermined period of time determined by timing motor 32. More particularly, timing motor 32, when energized, causes rotation of a rotor 40 provided with a cam surface 41 adapted to engage an abutment 42 mechanically coupled to push button 21 and switch blade 29. The mechanical arrangement comprising the elements 21, 29 and 42 constitutes a latching switch which is adapted, when manually actuated, to latch in the "on" position to supply energization to the various elements to be described, and which is adapted to be unlatched by timing motor cam surface 41 after a fixed time interval (typically, after ten seconds). Latching start switch 21, 29, 42 and its cooperating timing motor 32, 40, 41 comprises a commercially available unit, and does not per se comprise the present invention.

Transformer 36 includes a secondary winding 43 one side of which is connected to ground line 25, and the other side of which is connected to a neon tube voltage regulator 44 comprising a pair of series-connected current-limiting resistors 45 and 46, and a plurality of neon tubes 47 connected in series with one another between one end of resistor 46 and ground line 25 to regulate the voltage at terminal 48. Voltage regulator terminal 48 is in turn connected via line 49 to a wiper 50 engaging a conductive arcuate commutator section 51. Commutator section 51 is movable to any one of three different positions under the control of film speed switch 23, and is provided with an outstanding segment 52 adapted to engage any one of three fixed contacts 53, 54, and 55. The film speed switch further includes a conductive commutator section 56 movable with section 51 and provided with a further segment 57 adapted to engage any one of fixed contacts 58, 59 and 60.

The three fixed contacts 53, 54, and 55 are connected respectively to the upper ends of three potentiometers 61, 62 and 63, whereas the fixed contacts 58, 59 and 60 are connected respectively to the sliders 64, 65, and 66 on said potentiometers. The actual positions of said sliders 64, 65 and 66 can be pre-adjusted (and/or varied when desired) by means of manual screw settings 67, 68 and 69. The lowermost ends of the several potentiometers 61, 62 and 63 are connected together to ground line 25 and to one electrode 68 of the electroluminescent lamp 39. The other electrode 69 of said lamp 39 is connected to a wiper 70 which engages film speed switch commutator section 56.

With the several parts arranged in the manner shown in FIG. 5, switch 29, 30 is normally open and no energization is supplied to solenoid 37 or to lamp 39. When push button 21 is manually depressed, switch 29, 30 is closed to complete a circuit from line 26 through fuse 28 to contact 30; and the start switch latches in this closed position. The closure of switch 29, 30 energizes timing motor 32 to rotate rotor 40, and also energizes primary winding 35 of transformer 36, and solenoid 37, which are connected in parallel with one another. The energization of solenoid 37 operates to depress movable platen 38 thereby to clamp a piece or sheet of film between said platen 38 and resilient platen 20 (FIG. 1) for a precise period of time determined by timing motor 32.

The energization of transformer primary winding 35 causes a regulated voltage to be applied via line 49 to wiper 50; and, with the commutator 51, 56 in the position shown in FIG. 5, the voltage on wiper 50 is coupled via commutator segment 52 and contact 53 to the upper end of potentiometer 61 and thence, via slider 64, to fixed contact 58, commutator segment 56, wiper 70, and electrode 69 of lamp 39. Since electrode 68 of lamp 39 is grounded, lamp 39 is energized at a potential which is determined by the position of wiper 64 on potentiometer 61.

If the film speed switch 23 should be moved to the position marked "2," a similar energization circuit will be completed except that contacts 54 and 59 will now be active to supply power to lamp 39 in accordance with the setting of slider 65 on potentiometer 62. Movement of the film speed switch 23 to the position marked "3" will bring into play contacts 55 and 60 so as to energize lamp 39 in accordance with the setting of slider 66 on potentiometer 63. It will be noted that the several sliders 64, 65, and 66 are set at different resistance values in the circuit of FIG. 5 so that, as a result, different predetermined fixed potentials may be supplied to lamp 39 for the three different settings of film speed switch 23. The actual intensity of the light emitted by lamp 39 may thus be changed by movement of film speed switch 23; and the intensity achieved at any particular position of said switch 23 is in turn preadjusted by means of the screw settings 67, 68 and 69. As a result of this arrangement, any one of three different light intensities can be selected by switch 23 corresponding to "slow" (insensitive), "medium," and "fast" (sensitive) films; and the user of the equipment can readjust the actual light intensity achieved at any particular setting in accordance with the particular speed of film to be exposed and processed.

Energization of timing motor 32 causes rotation of rotor 40 until cam 41 engages abutment 42 to unlatch starting switch 21, 29, 30. Timing motor 32 is of the synchronous type so that, once energized, it automatically unlatches switch 21, 29, 30 after a very accurate time interval. When switch 29, 30 is opened, power is removed from transformer 36 so as to extinguish lamp 39 and, at the same time, solenoid 37 is de-energized so as to permit spring elements 82, 83 (FIG. 4) coupled to movable platen 38 to retract said platen, thereby releasing the film for immediate processing.

The several electrical and mechanical components described in reference to FIG. 5 are physically laid out on a chassis as illustrated in FIGS. 2 and 3. Numerals corresponding to those already described in reference to FIG. 5 have been used in FIGS. 2 and 3 so that the several parts can be readily identified. It will be appreciated, of course, that physical layouts other than those specifically shown in FIGS. 2 and 3 can be employed; and it will also be appreciated that, for simplicity, the several electrical connections between parts have been omitted.

The chassis itself has been designated 80, and the bottom of said chassis is provided with a rectangular cutout 81 adapted to receive solenoid actuated movable platen 38. Platen 38 is of generally rectangular configuration, and has dimensions slightly less than those of cutout 81 so that the platen 38 can be moved through said cutout when solenoid 37 is energized. Platen 38 is normally suspended by spring means 82 and 83 above, and in a plane parallel to, resilient platen 20 (FIG. 1), and platen 38 is urged toward resilient platen 20 against the restraining force of springs 82 and 83 when solenoid 37 is energized.

As best shown in FIGS. 4 and 4A, movable platen 38 is of sandwich-like configuration comprising a rectangular support element 85 mounted parallel to and spaced from a plastic window element 86, with lamp 39 being disposed between said elements 85 and 86. Lamp 39 comprises a glass encapsulated metal electroluminescent lamp preferably having a blue-green phosphor, and may be one inch in width, six inches in length, and 0.050 inch in thickness. Such lamps are commercially available. The window structure 86 comprises a plastic material which is coated with an opaque material except for a central rectangular region 87 acting as a light diffusing window for the emission of light from lamp 39. Window 87 is, in normal practice, covered by an appropriate varying density transparency or gray scale positioned, emulsion side out, over the window as indicated by broken lines 89 (FIG. 4A) and held in place by appropriate means such as double-sided pressure sensitive tape. An attaching arrangement of this type permits the varying density transparency or gray scale to be easily changed by the user when desired, and also enables intimate emulsion-to-emulsion contact to be obtained between the transparency and the film being exposed.

The overall use of the equipment has been described previously in the sections of this specification entitled "Background of the Invention" and "Summary of the Invention," and will not be repeated in detail. In practice, prior to processing a large sheet of sensitized material, a corner of said sheet (or a suitable separate piece of identical unexposed film) can be registered against stops or guides 18 and 19 in entry slot 17, whereafter the start push button 21 is depressed. The start button becomes mechanically latched, and causes energization of a timing device and a voltage-regulated exposing light; and, at the same time, causes the solenoid operated platen 38 to clamp the sheet of sensitized material accurately in place with the emulsion side of the gray scale or other varying density transparency in contact with the emulsion side of the sensitized material. In this respect, the light sensitive sheet, when inserted into slot 17, is inserted with the base side of the sheet in contact with resilient platen 20, and with its emulsion side up. Upon termination of the fixed time interval determined by the timing mechanism, exposing light 39 is automatically extinguished, the timer mechanism is automatically reset, and the solenoid 37 is deenergized so that clamping platen 38 and its integral light source 39 are raised under the influence of the retraction springs 82, 83 to release the sensitized material and make it available for immediate processing.

In order to accommodate a variety of film speeds or sensitivities, such as may be encountered in the graphic arts, a plurality of individually adjustable but pre-set light levels are made available via the film speed switch 23. By this arrangement, a repeatable standard exposure can be achieved during the fixed time interval governed by the timer mechanism.

The overall apparatus can be employed to make sensitometric exposures, when and as desired, directly on a piece of sensitized material of the type already in routine use immediately prior to process of sheets of such material, thus eliminating the risk of latent image failure and also eliminating the need for special storage facilities for the relatively costly process control strips. Alternatively, if desired, such sensitometric exposures can be made in an assigned area on the same sheet of emulsion as is used in the process camera, for example on a previously unexposed region of such an exposed image-bearing sheet, thus minimizing data recording and storage problems by presenting the process control information adjacent to the developed photographic image. It will be further appreciated, moreover, that the equipment of the present invention can be used for other purposes, such as repetitively applying titling information, or other data, to suitable sheets of light sensitive material, and this can be achieved simply by appropriate choice of the varying density transparency which is removably attached to movable platen 38.

While I have thus described a preferred embodiment of the present invention, many variations will be suggested to those skilled in the art. For example, the electroluminescent lamp intensity may be controlled by appropriately varying the frequency of energizing potential applied to the lamp, rather than by varying the magnitude of that potential. It must therefore be understood that the foregoing description is intended to be illustrative only and not limitative of my invention, and all such variations and modifications as are in accord with the principles described are meant to fall within the scope of the appended claims.

Having thus described my invention, I claim:

1. A photographic exposure apparatus comprising a first substantially resilient flat platen mounted in fixed position, a movable second flat platen positioned adjacent to said first platen in substantially parallel relation thereto, electroluminescent light source means having a flat areal light emission surface, said light source means being carried by one of said platens, resilient means for normally holding said second platen in spaced parallel relation to said first platen, a solenoid coupled to said second platen, a solenoid energization circuit, a manually operable start switch, timing means coupled to said start switch and to said solenoid energization circuit for energizing said solenoid in response to operation of said start switch to move said second platen to a position closely adjacent to said first platen against the restraint of said resilient means for a predetermined fixed interval of time and for thereafter de-energizing said solenoid to permit said resilient means to move said second platen away from said first platen, and an energizing circuit operable in response to operation of said start switch and said timing means for applying an energizing voltage to said electroluminescent light source means simultaneous with energization of said solenoid and for removing said energizing voltage from said light source means simultaneous with de-energization of said solenoid.

2. The apparatus of claim 1 wherein said electroluminescent light source means comprises an electroluminescent lamp carried by and movable with said second platen.

3. The apparatus of claim 2 wherein said electroluminescent lamp is embedded within said second platen, the surface of said second platen which faces said first platen defining a window for the emission of light from said lamp toward said first platen.

4. The apparatus of claim 3 including a variable density transparency removably attached to said second platen surface and overlying said window whereby said transparency is movable with said second platen toward and away from said first platen.

5. The apparatus of claim 2 wherein said lamp energizing circuit includes control means for coupling said lamp to a selected one of a plurality of different sources of energizing voltage to permit any one of a plurality of different light levels to be emitted by said electroluminescent lamp during said predetermined fixed interval of time, and means for adjusting the voltage supplied by each of said plurality of energizing voltage sources.

6. The apparatus of claim 5 wherein said plurality of different energizing voltage sources comprise a plurality of potentiometers, a main voltage source, voltage regulating means coupling said main source to each of said potentiometers, and switch means for connecting a selected one of said potentiometers to said electroluminescent lamp.

7. The apparatus of claim 1 including an automatic film processor comprising means for developing, fixing, washing, and drying exposed light sensitive material, said film processor having an externally positioned input feed tray, said photographic exposure apparatus being mounted adjacent said input feed tray and comprising a unitary portion of said automatic film processor.

8. The apparatus of claim 7 including guide means disposed adjacent said feed tray and bounding at least a portion of said first platen for accurately positioning a piece of sensitized material relative to said first and second platens.

References Cited

UNITED STATES PATENTS

| | | | |
|---|---|---|---|
| 2,959,114 | 11/1960 | Brundage | 355—100 |
| 3,166,998 | 1/1965 | Watson | 355—80 |
| 3,331,276 | 7/1967 | Oliver | 355—100 |

JOHN M. HORAN, Primary Examiner

R. P. GREINER, Assistant Examiner

U.S. Cl. X.R.

355—99, 115, 120